United States Patent

Nakai et al.

[15] 3,646,432
[45] Feb. 29, 1972

[54] SYSTEM FOR MEASURING THE LOSS OR GAIN COEFFICIENT OF A TRANSMISSION MEDIUM

[72] Inventors: Taiichiro Nakai, Fujisawa; Hiroshi Sakaki; Masanori Sato, both of Tokyo; Hiroshi Yuguchi, Yokohama, all of Japan

[73] Assignee: Kokusai Denshin Denwa Kabushiki Kaisha, Tokyo-to, Japan

[22] Filed: May 14, 1970

[21] Appl. No.: 37,236

[52] U.S. Cl. ........................................................324/57 R
[51] Int. Cl. .......................................................G01n 27/00
[58] Field of Search....................................................324/57

[56] References Cited

UNITED STATES PATENTS

| | | | |
|---|---|---|---|
| 3,479,585 | 11/1969 | Liebel et al. | 324/57 |
| 3,526,834 | 9/1970 | Brown | 324/57 |
| 2,618,686 | 11/1952 | De Lange | 324/57 |

*Primary Examiner*—Edward E. Kubasiewicz
*Attorney*—Robert E. Burns and Emmanuel J. Lobato

[57] ABSTRACT

A system for measuring the infinitesimal transmission coefficient of a transmission medium in which a measuring signal is repeatedly passed through the transmission medium, such as a cable or the like, so that the infinitesimal transmission coefficient of the transmission medium is magnified in proportion to the number of repeating cycles of the measuring signal in the transmission medium up to a value sufficient to be readily and precisely measured.

6 Claims, 3 Drawing Figures bin3,646,432

SYSTEM FOR MEASURING THE LOSS OR GAIN COEFFICIENT OF A TRANSMISSION MEDIUM

This invention relates to measuring for the determining transmission coefficient (i.e.; transmission loss or transmission gain) of a transmission medium, such as a cable or the like.

To measure the effect of change of external conditions on the characteristic of a transmission medium by way of example, the measurement of the infinitesimal transmission loss is necessary. In this case, subjects of study and development are usually directed to raise only the preciseness of a level meter in this field of art. However, since the improvement of preciseness of such a level meter has a limit, it is impossible to measure at a high precise manner a very small transmission coefficient or a very small value between two transmission coefficients solely by the improvement of the level meter.

An object of this invention is to provide a measuring system for such infinitesimal transmission coefficient which are too small for measurement by conventional measuring system.

In accordance with the principle of this invention, a measuring signal is repeatedly passed through a transmission medium, such as a cable or the like, so that the small transmission coefficient of the measured object or medium is magnified, in proportion to the number of repeating cycles of the measuring signal in the measured object up to a value sufficient to be readily and precisely measured.

The principle, construction, operation and merits of the system of this invention will be better understood from the following more detailed discussion in conjunction with the accompanying drawings, in which the same or equivalent parts are designated by the same or equivalent reference numerals, characters and symbols, and in which.

Figure 1:
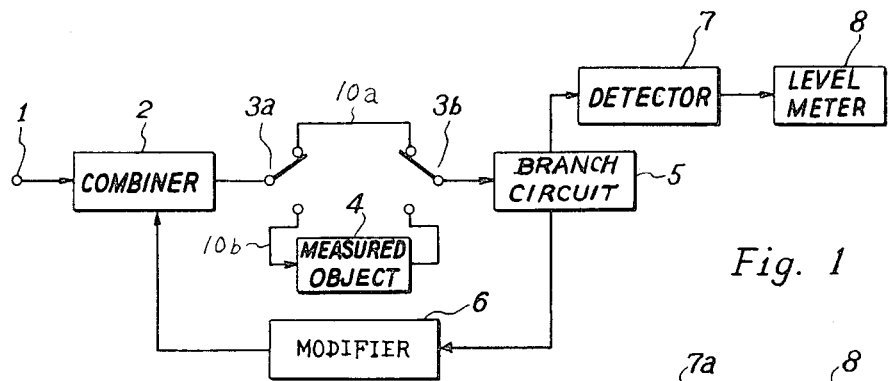
FIG. 1 is a block diagram illustrating an embodiment of this invention.

With reference to FIG. 1, an example of the system of this invention comprises an input terminal 1 receiving a measuring signal, a combiner 2 (e.g.; a hybrid transformer), one of whose two inputs is connected to the input terminal 1, a switch 3a connected to the output of the combiner 2 to apply this output to either one or the other of two paths 10a and 10b, a switch 3b used to select either one or the other of respective outputs of the two paths 10a and 10b, a branch circuit 5 (e.g.; a hybrid transformer) whose input is connected to the output of the switch 3b, a modifier 6 connected between one of two outputs of the branch circuit 5 and the other of the two inputs of the combiner 2, a detector 7 connected to the other output of the branch circuit 5, and a level meter 8 connected to the output of the detector 7. A measured object 4, such as a coaxial cable, is inserted in one of the two paths 10a and 10b between the switches 3a and 3b, while the other of the two paths 10a and 10b comprises a shorting conductor in this example. The modifier 6 is employed to modify the measuring signal circulating in a loop defined by the combiner 2, the switch 3a, one of the two paths 10a and 10b, the switch 3b, the branch circuit 5, the modifier 6, and back to the combiner 2; so as to identify the number of cycles of this circulation by the detector 7. In other words, the measuring signal circulating in the loop is modified at the modifier 6 so as to obtain, at the output of the branch circuit 5, a modified measuring signal including "identifying information" representative of the number of cycles of the circulation of the measuring signal in the loop, while the level of the measuring signal is attenuated or amplified at the measured object 4 by the transmission coefficient of the measured object 4 for each cycle of the circulation. The detector 7 detects the level of the modified measuring signal obtained at the output of the branch circuit 5 in consideration of the modifying principle in the modifier 6.

In operation, the switches 3a and 3b are switched to the path 10a so that the measuring signal applied from the input signal circulates in the loop: 2–3a–10a–3b–5–6–2. In this case, it is assumed that the level of modified measuring signal circulated by n times in the loop and detected by the detector 7 is a value of A decibels (indicated with respect to a reference level: 1 microvolt or 1 milliwatt as 0 decibels) measured by the level meter 8. Thereafter, the switches 3a and 3b are switched to the path 10b. In this case, it is also assumed that the level of modified measuring signal circulated by n times in the loop and detected by the detector 7 is a value of B decibels (db) obtained by measurement of the level meter 8. The transmission coefficient X db of the measured object 4, the values A db and B db and circulating cycles n have the following relationship:

$$B\ db = A\ db - (1+n)X\ db \qquad (1)$$

Therefore, $$X\ db = A\ db - B\ db/1+n) \qquad (2)$$

As understood from the equation (2), the transmission coefficient X db can be measured by the measuring system of this invention after multiplication by $(1+n)$ times. The number of multiplication times $(1+n)$ corresponds to the number of passing times of the measuring signal through the measured object 4. In other words, the preciseness of the level meter 8 is effectively raised by the multiplication times $(1+n)$. The number $n$ of circulating cycles of the measuring signal is fifty or one hundred by way of example. Since the number $n$ of circulating cycles of the measuring signal can be increased in proportion to decrease of the transmission coefficient X db in view of linearities of the loop, the detector 7 and the level meter 8, the measuring system of this invention is suitable to measure a very small transmission coefficient of a transmission medium.

Identifying information representative of the number of circulating cycles of the measuring signal may be any kind of configuration of information.

Figure 2:
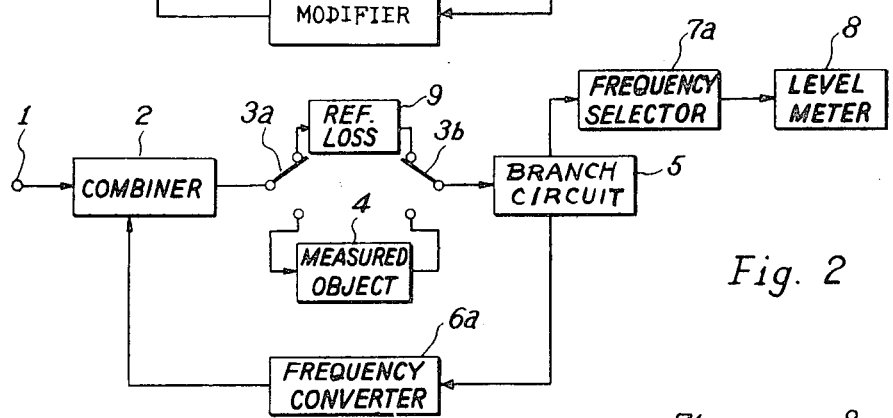
FIGS. 2 and 3 show, respectively, block diagrams each for illustrating another embodiment of this invention.

If the identifying information has the configuration of frequency-information, the modifier 6 is a frequency converter 6a for shifting the frequency $f_o$ of the circulating, measuring signal by a value $df$ for each passing therethrough, while the detector 7 is a frequency selector 7a as shown in FIG. 2. In this case, since the modified measuring signal applied to the detector 7 has a frequency $f_o + n \cdot df$ (or $f_o - df$) after n circulating cycles of the measuring signal in the loop, the frequency selector 7a selects the modified measuring signal of frequency $f_o + n \cdot df$ (or $f_o - n \cdot df$) so that the level of the modified measuring signal selected by the frequency selector 7a can be measured by the level meter 8.

Figure 3:
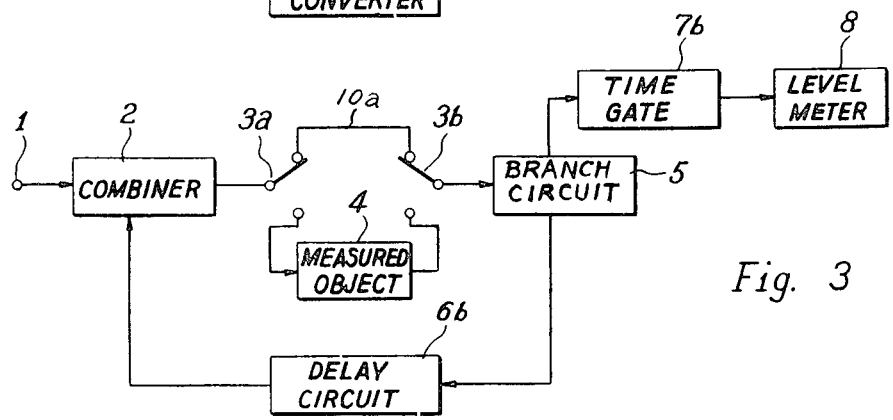

Moreover, if the identifying information has the configuration of time-information, the modifier 6 is a delay circuit 6b having a delay time $t$, while the detector 7 is a time gate 7b as shown in FIG. 3. In this case, a keying wave having a desired frequency of a carrier wave is employed as the measuring signal. The keying wave is delayed by a delay time $n \cdot t$ after $n$ circulating cycles of the keying wave in the loop and applied to the time gate 7b. This time gate 7b detects the keying wave delayed by the delay time $n \cdot t$.

It is desirable, when measuring a transmission loss of the measuring signal in the loop: 2–3a–10a–3b–5–6–2 to increase the circulating number $n$ of the measuring signal in the loop so as to raise the preciseness of measurement.

In the measuring system of this invention, if a device 9 having a reference or known loss is inserted in the line 10a between the switches 3a and 3b as shown in FIG. 2, a difference between the value of the known loss 9 and the transmission coefficient X db of the measured object 4 can be measured by the level meter 8.

What we claim is:

1. A system for measuring a small transmission coefficient of a transmission medium, comprising:
    input terminal means for receiving a measuring signal,
    combiner means having first and second inputs and an output, wherein said first input is connected to the input terminal means,
    branch circuit means having an input and first and second outputs for branching an input signal to said two outputs thereof,
    switch means connected between said combiner means and branch circuit means for selectively connecting said combiner means output directly to said branch circuit means input or connecting said combiner means output to said branch circuit means input through a transmission medium to be measured, modifier circuit means connected between said first output of the branch circuit means and the second input of the combiner means to modify the measured signal circulating in a loop, which is formed by the combiner; the switch means; selectively, the transmission medium; the branch circuit means; and the modifier circuit means; so as to obtain at the second output of the branch circuit means a modified measuring signal including identifying information representative of the number of circulating cycles of the measuring signal in said loop, detecting means connected to the second output of the branch means to detect the modified measuring signal in response to the identifying information, and level meter means connected to the detecting means for measuring the level of the modified measuring signal detected by the detecting means.

2. A measuring system according to claim 1 wherein the modifier circuit means is a frequency converter for shifting the frequency of the input signal thereof, as received from the first output of the branch circuit means, by a predetermined frequency so as to obtain the modified measuring signal including the identifying information indicated in the signal configuration of frequency-information, and wherein the detecting means includes a frequency selector.

3. A measuring system according to claim 1, wherein the modifier circuit means is a delay circuit for delaying the input signal thereof, as received form the first output of the branch circuit means, by a predetermined time so as to obtain the modified measuring signal including the identifying information indicated in the signal configuration of time-information, and wherein the detecting means includes a time gate.

4. A measuring system as set forth in claim 1, further comprising a device having a known loss characteristic, and in which said switch means comprises first and second switches, and means for connecting said known loss device and said transmission medium to said first and second switches for permitting selective coupling of said known loss device and said transmission medium in said loop, wherein a difference can be measured by said level meter means known loss and the transmission coefficient of the transmission medium.

5. A measuring system according to claim 4, wherein the modifier circuit means is a frequency converter for shifting the frequency of the input signal thereof, as received from the first output of the branch circuit means, by a predetermined frequency so as to obtain the modified measuring signal including the identifying information indicated in the signal configuration of frequency-information, and wherein the detecting means includes a frequency selector.

6. A measuring system according to claim 4, wherein the modifier circuit means is a delay circuit for delaying the input signal thereof, as received from the first output of the branch circuit means, by a predetermined time so as to obtain the modified measuring signal including the identifying information indicated in the signal configuration of time-information , and wherein the detecting means includes a time gate.

* * * * *